United States Patent [19]
Washizu

[11] Patent Number: 5,973,729
[45] Date of Patent: Oct. 26, 1999

[54] IMAGE INPUT DEVICE CAPABLE OF IDENTIFYING DIFFERENT ADAPTORS INSERTED INTO THE INPUT DEVICE

[75] Inventor: Yoichi Washizu, Higashimurayama, Japan

[73] Assignee: Olympus Optical Co., Ltd., Tokyo, Japan

[21] Appl. No.: 08/700,513

[22] PCT Filed: Jun. 3, 1996

[86] PCT No.: PCT/JP96/01494

§ 371 Date: Nov. 14, 1996

§ 102(e) Date: Nov. 14, 1996

[87] PCT Pub. No.: WO97/00572

PCT Pub. Date: Jan. 3, 1997

[30]   Foreign Application Priority Data

Jun. 16, 1995   [JP]   Japan ................................... 7-150553

[51] Int. Cl.⁶ .................................................. H04N 1/04
[52] U.S. Cl. ........................... 348/96; 348/110; 353/119; 353/120
[58] Field of Search ................................. 348/96, 97, 98, 348/107, 110, 112; 353/120, 119; 386/128, 129

[56]   References Cited

U.S. PATENT DOCUMENTS

| | | | |
|---|---|---|---|
| 5,047,794 | 9/1991 | Pagano et al. ........................ | 354/275 |
| 5,092,535 | 3/1992 | Murata et al. ....................... | 342/348.2 |
| 5,229,585 | 7/1993 | Lemberger et al. .................... | 235/375 |
| 5,486,895 | 1/1996 | Leidig et al. ........................ | 355/50 |
| 5,563,984 | 10/1996 | Tanibata .............................. | 355/40 |
| 5,673,104 | 9/1997 | Rottner .............................. | 358/497 |
| 5,710,642 | 1/1998 | Kiesow .............................. | 358/474 |

FOREIGN PATENT DOCUMENTS

| | | | |
|---|---|---|---|
| 56-123266 | 5/1988 | Japan ............................. | H04N 1/04 |
| 2-257760 | 10/1990 | Japan ............................. | H04N 1/04 |
| 5-244349 | 9/1993 | Japan ............................. | H04N 1/04 |
| 8-56277 | 2/1996 | Japan ............................. | H04N 1/00 |
| 8-65469 | 3/1996 | Japan ............................. | H04N 1/19 |
| 409304848 | 11/1997 | Japan ............................. | H04N 1/00 |

OTHER PUBLICATIONS

The Popular Photography Article, p. 8—issue 1994.

*Primary Examiner*—Vu Le
*Attorney, Agent, or Firm*—Louis Weinstein

[57]   ABSTRACT

An image input device capable of: reading images on 35 mm film and images on another type of film contained in a new photo system-adapted cartridge; converting the images into digital image signals; and, feeding the signals into a computer. The device is constructed in such a manner that one selected between film adaptors (100, 300) can be loaded in a groove portion (2) of a main device body. The film adaptor (100) can retain 35 mm film (401, 402), while the film adaptor (300) can retain a new photo system-adapted cartridge film (403). The images on the loaded film are read by a linear CCD image sensor (9) being caused to execute scanning. This scanning results in the digital image signals which then are fed into a computer and the like.

16 Claims, 6 Drawing Sheets

IMAGE INPUT DEVICE CAPABLE OF IDENTIFYING DIFFERENT ADAPTORS INSERTED INTO THE INPUT DEVICE

TECHNICAL FIELD

The present invention relates to an image input device and, more particularly, to an image input device for converting images on photographic film into electrical signals and then feeding the signals into a computer and the like.

BACKGROUND ART

Traditionally, 35 mm type photographic film (hereinafter called 35 mm film), whose photographic picture plane is 24 mm long by 36 mm wide in dimension, has widely and universally prevailed. In addition, a film scanner has also been well known, which is capable of converting images on the aforesaid film into digital image signals and then feeding the digital image signals into a computer.

For example, published Japanese Patent Application Laid-Open No. 5 (Heisei 5 or the year of 1993)-244349 discloses an image-digitizing device in which a device for digitizing the images on the 35 mm film is proposed. This device can read and digitize images provided on both slide film and strip-like negative film, and then can feed the digitized images into a computer. The slide film is a sheet of film which is cut every single frame. The slide film is held in a slide mount. The strip-like negative film is a sheet of film which is cut every six frames.

A monthly magazine "Popular Photography" (October 1994, page 8) introduces a new photo system, i.e., an advanced photo system, which is applicable to new film that is different from the prevalent 35 mm film. In the new photo system, a small-sized, film cartridge contains a roll of unused film or developed film, including a leader portion. Such film is smaller in width than the 35 mm film. The unused film or developed film is taken out of the film cartridge at the time of photographing, or printing, and image reproduction. As a result, users are typically precluded from taking a direct look at a strip of the aforesaid film.

The construction of the film cartridge applicable to the new photo system is seen from, e.g., U.S. Pat. No. 5,047,794 (corresponding to Japanese Patent Application Laid-Open No. 4 (Heisei 4 or the year of 1992)-237043 which discloses a film cassette (cartridge) with a lock-out means for preventing exposed film from being loaded therein. The above film cartridge prevents a partially or substantially exposed film cartridge from being inserted into various cameras.

The aforesaid new photo system-adapted, small-sized film cartridge would be applicable to a film scanner as well if being designed to contain a roll of developed film in a manner that the film is pulled out of the cartridge, whenever necessary. However, the image-digitizing device shown in the aforesaid Patent Application No. 5-244349 is of the type for picking up images on the 35 mm film. That is, the device is constructed in a manner unapplicable to the aforesaid small-sized film cartridge, and is thus impossible to read images on the cartridge-contained film.

In addition, no proposals have been made yet to a film scanner device in which the film contained in the new photo system-adapted cartridge is pulled therefrom to read images on the film, and then image data is input into a computer.

The present invention is produced to overcome the aforesaid inconveniences. Thus, an object of the present invention is to propose an image input device capable of reading images on different types of film, such as the above-mentioned 35 mm film or the new photo system-adapted film, and then feeding image data into the computer.

DISCLOSURE OF THE INVENTION

The present invention provides an image input device for reading images on film and then converting the images into digital signals, comprising: a first film-retaining means capable of retaining first type film; a second film-retaining means capable of retaining second type film which differs in form from the first type film; a loading means, by which one selected between the first and second film-retaining means is removably loaded onto a main body of the image input device; an illumination means for illuminating the film; a linear CCD image sensor for reading images on the film; and, an optical member, by which the images on the film illuminated by the illumination means are formed on the linear CCD image sensor.

In the above-mentioned image input device, one of the film-retaining means having either the first or second type film held therein is loaded onto the main body of the device. The illumination means, the linear CCD image sensor, and the optical member are jointly moved with respect to the loaded film in order to execute scanning over a film surface. Then, the linear CCD image sensor outputs image data.

BEST MODE FOR CARRYING OUT THE INVENTION

Figure 1:
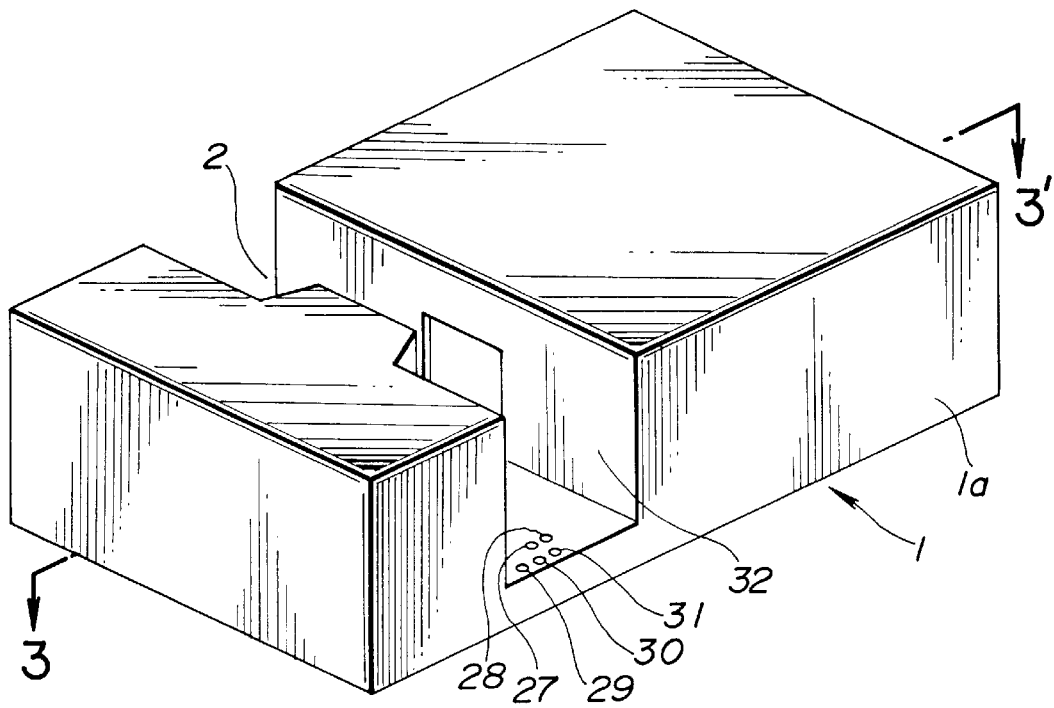
FIG. 1 is a perspective view, illustrating an appearance of a film image input device having a film adaptor detached therefrom, which device is an image input device embodying an aspect of an embodiment of the present invention.

An embodiment of the invention will now be described with reference to the drawings. Prior to a detailed description of a film image input device or an image input device according to an aspect of the embodiment, it will initially be described how a linear CCD image sensor behaves when being used to read images. This image sensor is designed for use in the image input device according to the aspect of the present embodiment.

The linear CCD image sensor is an image sensor having light-receiving pixels arranged in line. For image reading, this image sensor initially reads a line of pixels, and feeds corresponding image data therefrom. Then, the linear CCD image sensor is moved by a distance of one pixel in a direction perpendicular to the CCD sensor's pixel array. The sensor thereby reads the following line of pixels, and feeds corresponding image data therefrom. Such action is repeated to read an image on a sheet of film. In this connection, the action in which the linear CCD image sensor reads an image in one line is hereinafter referred to as main scanning. Meanwhile, the action in which the linear CCD image sensor is moved to the following line in order to read an image in such line is hereinafter referred to as sub-scanning.

The film image input device according to the present embodiment has the following linearly arranged: an illumination means for illuminating an original, or rather a film; a linear CCD image sensor for reading images on the film; and, an optical member for permitting the images on the film to be formed on the linear CCD image sensor. The illumination means, the linear CCD image sensor, and the optical member are jointly moved, thereby executing the sub-scanning. Then, the images on the film are converted into digital signals.

The film image input device 1 (see FIG. 1) is free of any mechanism for retaining the film inside a main body 1a of the device 1. Instead, two film adaptors are available as such mechanism, both of which can selectively be loaded onto and removable from the main device body 1a. One of these adaptors is a film adaptor 100, as shown by a perspective view of FIG. 5, and the other is a cartridge film adaptor 300, as illustrated by a perspective view of FIG. 9. The film adaptor 100, whose description will be given hereinafter, is a first film-retaining means for holding a first type film. The first type film includes slide film and strip-like film, both of which are 35 mm film. The cartridge film adaptor 300, whose description will be given hereinafter, is a second film-retaining means for retaining a roll of developed second type film. The second type film is contained in the aforesaid new photo system-adapted film cartridge.

Further, the film image input device 1 detects a type of the loaded film adaptor, and then determines an optimal sub-scanning range for a picture plane size of the film to be used.

Next, descriptions will be provided hereinbelow with regard to respective structures of the film image input device 1, 35 mm film adaptor 100, and cartridge film adaptor 300 according to the present embodiment. Further, it will be described hereinbelow how the device 1 behaves when each of the film adaptors is loaded onto the main device body 1a.

First of all, the structure of the film image input device will be described with reference to FIGS. 1–4.

Figure 2:
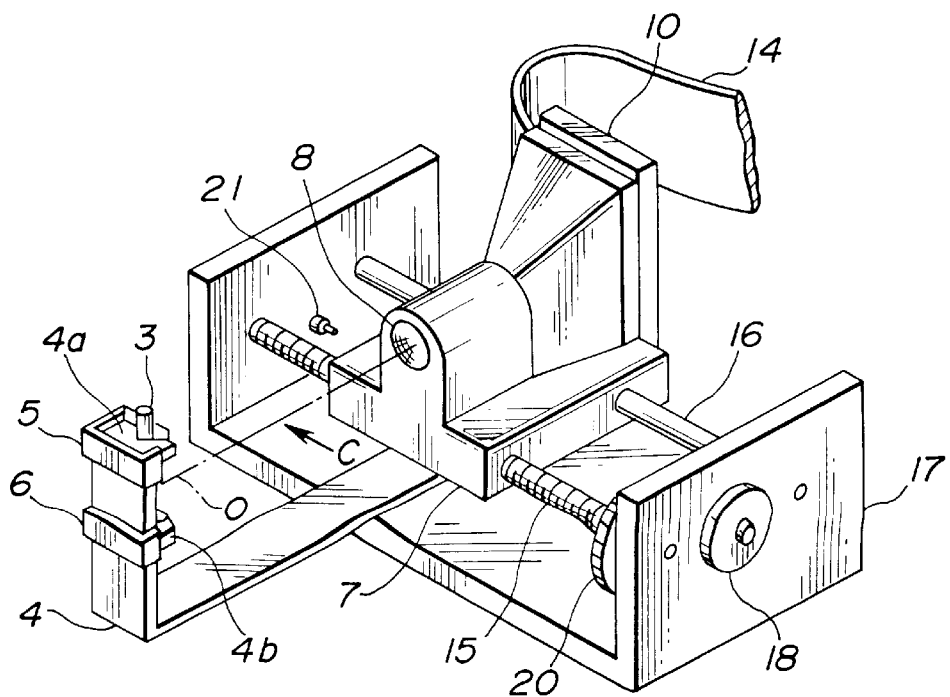
FIG. 2 is a perspective view, illustrating a mechanism section, with an outer-fitting member being removed from the film image input device of FIG. 1.
Figure 3:
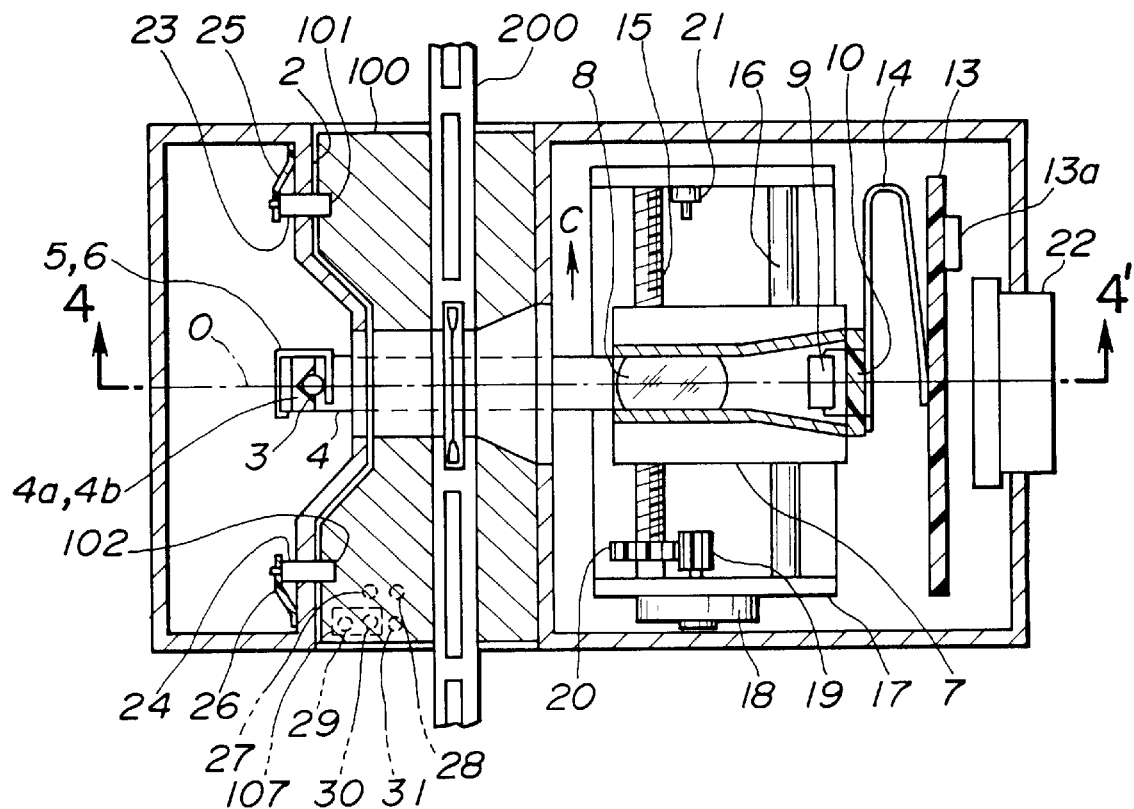
FIG. 3 is a cross-sectional view taken in the direction of arrows 313 3 of FIG. 1, illustrating the device of FIG. 1 having a 35 mm film adaptor fitted thereto.
Figure 4:
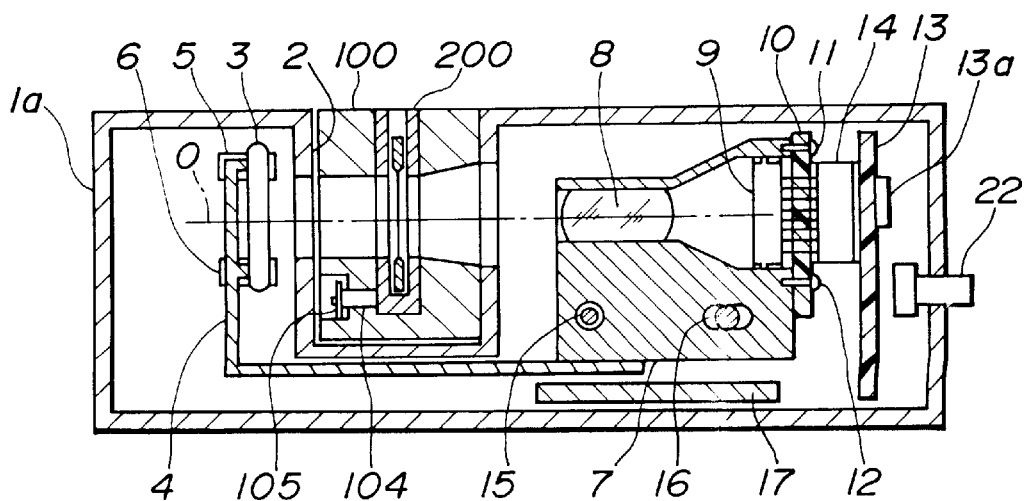
FIG. 4 is a cross-sectional view, taken along line 4-4' in FIG. 3.

In this connection, FIG. 1 is a perspective view illustrating an appearance of the device 1 having the film adaptor detached therefrom. FIG. 2 is a perspective view illustrating a mechanism section, with an outer-fitting member being removed from the device 1. FIG. 3 is a cross-sectional view taken in the direction of arrows 3—3 of FIG. 1, illustrating the device 1 having the 35 mm film adaptor fitted thereto. FIG. 4 is a cross-sectional view, taken along line 4-4' in FIG. 3.

As illustrated by the appearance in FIG. 1, the device main body 1a is provided with a groove portion 2. The groove portion 2 serves as a loading means or loading and unloading means for permitting the film adaptor 100 or cartridge film adaptor 300 for film retention to be loaded therein.

As shown by the perspective view of FIG. 2, and the cross-sectional views of FIGS. 3 and 4, the following are mainly arranged inside the main device body 1a: a bar-like lamp 3 which is an illumination means for illuminating the film, the lamp 3 being formed by a cold cathode tube or the like; a lens 8 which is an optical member for causing images on the film to be formed on the linear CCD image sensor 9; the preceding linear CCD image sensor 9; a control circuit board 13; a lens/CCD-retaining member 7 for retaining the preceding lens, linear CCD image sensor, circuit board, and the like; a threaded shaft 15 and a guide shaft 16 parallel to one another for movably supporting the lens/CCD-retaining member 7; and, a sub-scanning bed plate 17 for supporting the aforesaid shafts 15, 16. The foregoing control circuit board 13 is packaged with a processing circuit, CPU 13a, and the like. The processing circuit converts an output signal from the linear CCD image sensor 9 into a digital signal. CPU 13a controls the entire device. In addition, CPU 13a houses an adaptor-determining means, an image readout range-changing means, and the like.

The lamp 3 is held by a lamp-retaining member 4. The lamp-retaining member 4 is substantially L-shaped, and protrusions 4a, 4b are provided on one side of this L-shaped, lamp-retaining member 4. Each of the protrusions 4a, 4b has a V-shaped groove at its end. Leaf springs 5 and 6 are substantially rectangular-shaped leaf springs, which are members for anchoring the lamp 3 to the protrusion portions 4a, 4b. The other side of the L-shaped, lamp-retaining member 4 is fixed to the lens/CCD-retaining member 7, while extending under the groove portion 2 at a film-retaining section.

The linear CCD image sensor 9 is rigidly secured to a hard or stiff circuit board 10 by soldering. The circuit board 10 is fixed to the lens/CCD-retaining member 7 by machine screws 11, 12. The linear CCD image sensor 9, the bar-like lamp 3, and the lens 8 are arranged on a straight line. Further, these three components are held in such a manner that the line direction of the sensor 9 extends parallel with the axis of the lamp 3.

The circuit board 10, on which the sensor 9 is carried, and the control circuit board 13 are connected together through a flexible printed board 14 so as to be movable relative to one and other.

The lens/CCD-retaining member 7 is movably held by means of the parallel arranged, threaded shaft 15 and guide shaft 16. The threaded shaft 15 is rotatably supported at both ends on the rectangular-shaped, sub-scanning bed plate 17. In addition, the guide shaft 16 is supported at both ends on the bed plate 17 as well.

The threaded shaft 15 has a threaded groove, with which the lens/CCD-retaining member 7 is in threading engagement. A stepping motor 18 for driving the threaded shaft into rotation is mounted on the sub-scanning bed plate 17. The stepping motor 18 has a gear 19 rigidly mounted on an output shaft thereof. The gear 19 is in mesh with a gear 20 that is fixedly secured on the threaded shaft 15. As a result, a revolving force of the motor 18 is transmitted to the threaded shaft 15.

Accordingly, when the stepping motor 18 is driven, the threaded shaft 15 is rotated, whereby the lens/CCD-retaining member 7 is moved in parallel with the axis of the shaft 15, jointly with the lamp 3, the linear CCD image sensor 9, and the lens 8. In this way, the sub-scanning is executed in a direction intersecting a main scanning direction that is the line direction of the sensor 9.

The sub-scanning bed plate 17 is provided with a switch 21. The switch 21 serves to detect arrival of an end of the lens/CCD-retaining member 7 at an initial position. The initial position is a reference to the sub-scanning of the linear CCD image sensor 9. Thus, the initial position of the sub-scanning is taken as a location at which the lens/CCD-retaining member 7 is forced against the switch 21 after being moved in the direction of arrow C. (See FIG. 2 for the arrow.)

A connector 22 functions to mount a cable for interconnecting the image input device 1 and an unillustrated computer. The connector 22 is coupled to the circuit board 13 by means of an unillustrated lead wire.

Positioning pins 23, 24 are members for fixing a position at which the film adaptor is fitted. These pins 23, 24 are normally urged toward the groove portion 2 of the main device body 1a, while being supported on leaf springs 25, 26. The leaf springs 25, 26 are provided on a wall surface of the groove portion 2, and the pins 23, 24 extend through the main body wall surface. Thus, the positioning pins 23, 24 are retained in a retractable manner The groove portion 2 has contacts 27, 28 provided on the bottom thereof for supplying electric power to the cartridge film adaptor 300 when the adaptor 300 is fitted into the groove portion 2. The adaptor 300 will be described hereinafter. Further, the groove portion 2 has similar contacts 29, 30, 31 disposed on the bottom thereof, but these contacts are a gang of contacts for detection, which function as an adaptor-determining means. The adaptor-determining means detects a type of the loaded film adaptor.

When the 35 mm film adaptor 100 is loaded into the groove portion 2, the contacts 29, 30 are conducting. Then, the image input device 1 detects such loading of the adaptor 100. In addition, when the cartridge film adaptor 300 is loaded into the groove portion 2, the contacts 30, 31 are conducting. Then, the device 1 detects such loading of the adaptor 300. When none of the above two adaptors are loaded, the contacts 29, 30, 31 are not conducting to each other at all, whereby it can be detected that nothing has been loaded on the main body 1a.

Next, the structure of the 35 mm film adaptor 100 will be described with reference to FIGS. 5–8 in addition to the above-mentioned FIGS. 3 and 4.

Figure 5:
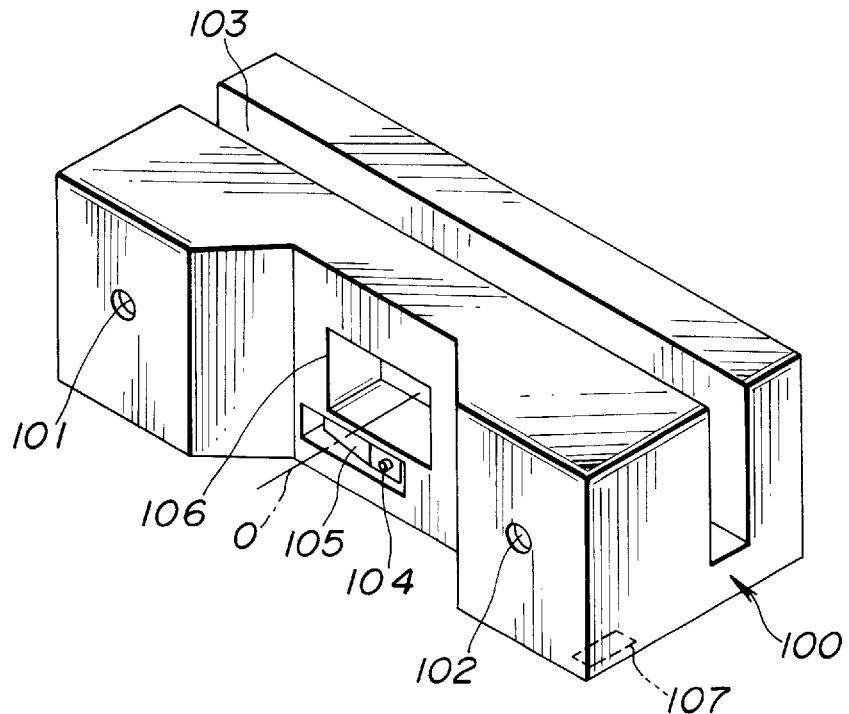
FIG. 5 is a perspective view, showing an appearance of the 35 mm film adaptor applicable to the device of FIG. 1.
Figure 6:
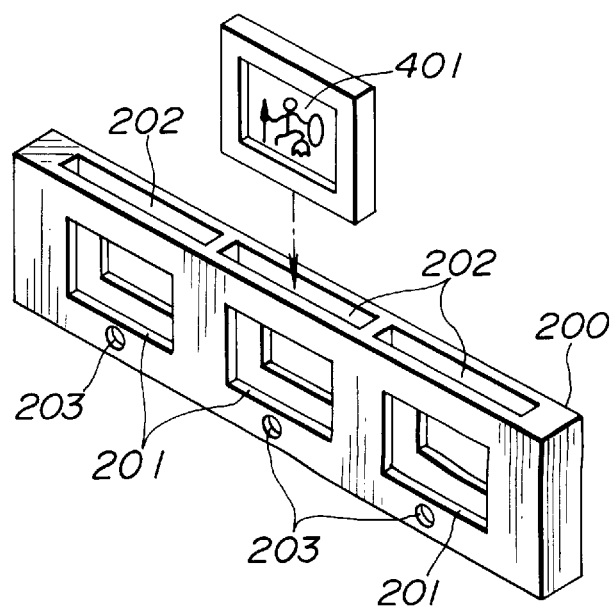
FIG. 6 is a perspective view, depicting a slide film carrier to be loaded onto the 35 mm film adaptor of FIG. 5 and a sheet of slide film to be mounted in the carrier.
Figure 7:
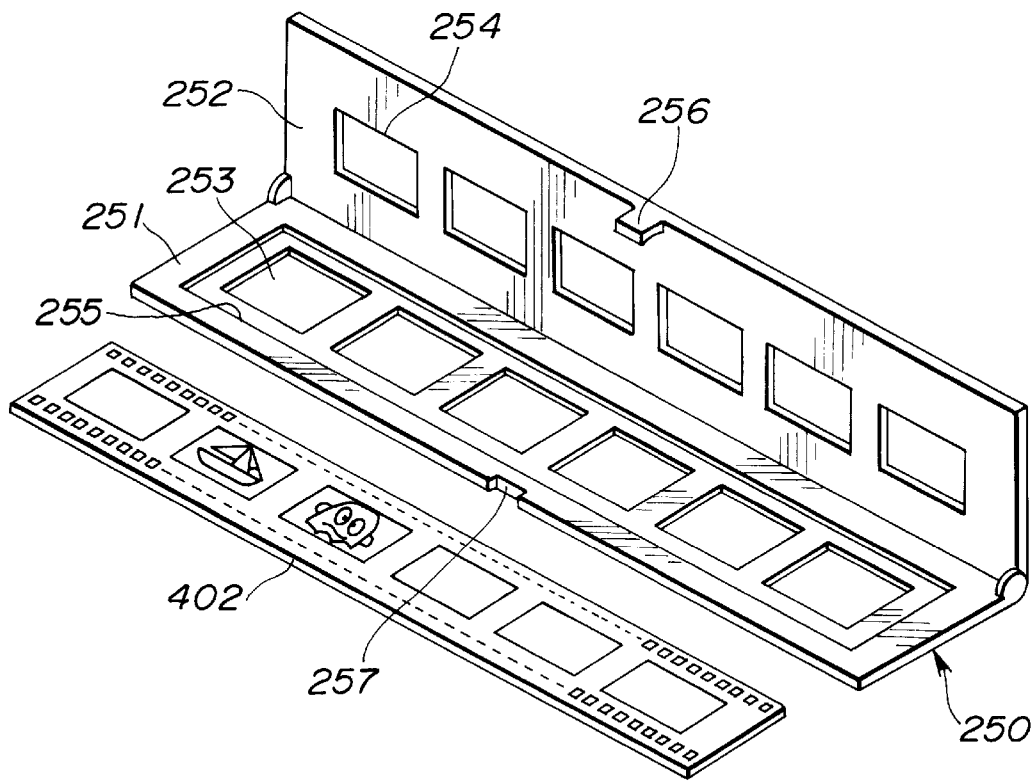
FIG. 7 is a perspective view, showing a strip film carrier with a sheet of strip-like film, which are loaded onto the 35 mm film adaptor of FIG. 5.
Figure 8:
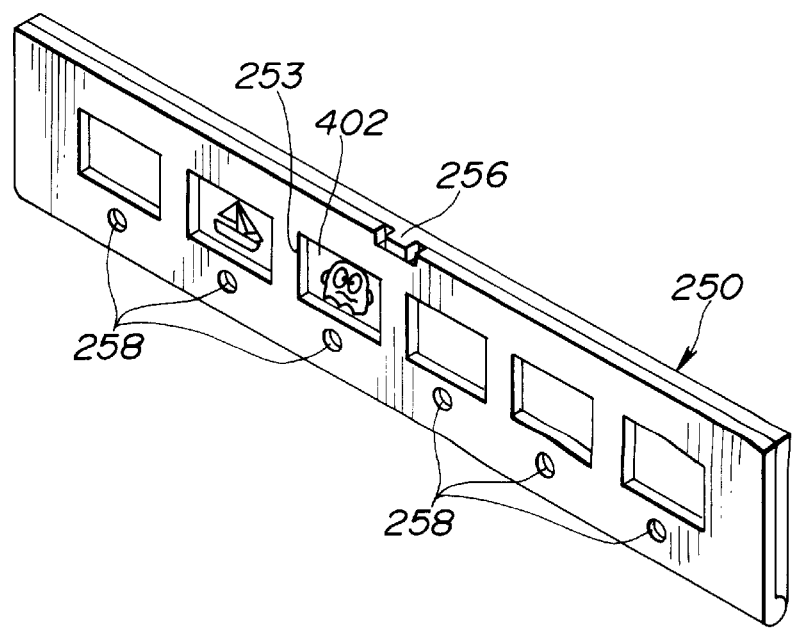
FIG. 8 is a perspective view, showing the strip film carrier of FIG. 7 having the film inserted and closed therein.

FIG. 5 is a perspective view showing an appearance of the 35 mm film adaptor 100. FIG. 6 is a perspective view showing a sheet of slide film to be mounted and a slide film carrier for retaining the former. FIG. 7 is a perspective view illustrating a sheet of strip-like film and a strip film carrier for retaining the former. FIG. 8 is a perspective view illustrating the strip film carrier shown in FIG. 7, but having the film inserted and closed therein.

The 35 mm film adaptor 100 is identical in outer configuration to the groove portion 2 of the main device body 1a, and can be loaded with exact fitting into the groove portion 2. The adaptor 100 has two indented portions 101, 102 provided on one side thereof for positioning the adaptor 100 when being loaded onto the main device body 1a. When the adaptor 100 is loaded onto the main body 1a, the positioning pins 23, 24 disposed on the main body 1a fit in with these indented portions 101, 102, respectively. Since the positioning pins 23, 24 are pushed by the leaf springs 25, 26, then the adaptor 100 is pressed against a wall surface 32 of the groove portion 2, thereby positioning the adaptor 100 in a direction of optical axis O. At the same time, the adaptor 100 is positioned in a plane vertical to optical axis O as well. (See FIGS. 3 and 4.)

The 35 mm film adaptor 100 has a metal plate 107 glued to the bottom thereof. The metal plate 107 is an electrically conductive member for discriminating information. The metal plate 107 causes the detecting contacts 29, 30 on the main body to be conducting when the adaptor 100 is loaded onto the main body. In addition, the adaptor 100 has a loading portion or slit 103 provided along a direction perpendicular to the direction of the optical axis of the adaptor 100. In the loading portion or slit 103, the slide film carrier 200 shown in FIG. 6 or the strip film carrier 250 shown in FIGS. 7 and 8 is loaded.

Further, the film adaptor 100 is provided with a rectangular opening 106 at an intermediate portion thereof. The opening 106 is centered at optical axis O, and is identical in size to each picture plane on the film. When each image on the film is placed at this position, the image is read by the linear CCD image sensor 9 of the image input device 1.

In addition, the adaptor 100 has a positioning pin 104 provided under the opening 106. This pin 104 is supported in a retractable manner by a leaf spring 105. The positioning pin 104 is fitted into each positioning indented portion 203 of the film carrier 200 or each positioning indented portion 258 of the film carrier 250, thereby facilitating the positioning of the film carrier 200. (See FIGS. 4, 5, 6, and 8.)

The slide film carrier 200 shown in FIG. 6 retains each sheet of mounted slide film 401. The carrier 200 has slits 202 and rectangular openings 201. A sheet of slide film 401 can be inserted into each of the slits 202. The opening 201 is identical in size to each picture plane on the slide film 401. The indented portions 203 are holes for positioning the film carrier 200 when the carrier 200 is loaded onto the 35 mm film adaptor.

When the slide film carrier 200 is inserted into the slit 103 of the film adaptor 100, the film picture plane must be aligned with the film adaptor opening 106. To this end, easy positioning can be accomplished by the carrier 200 and the adaptor 100 being properly moved in a manner that the adaptor positioning pin 104 fits in with the carrier dented portion 203. (See FIGS. 4, 5, and 6.)

The use of the strip-like film 402 is accompanied by the film carrier 250 shown in FIGS. 7 and 8. The film carrier 250 consists of two plate-like members 251, 252 which are provided with respective series of rectangular openings 253, 254 at positions coincident with frames on the film 402. These rectangular openings 253, 254 are identical in size to each film picture plane.

In order to mount the strip-like film 402 in the strip film carrier 250, the film 402 is initially carried on a concave portion 255 of the one plate-like member 251. Then, the other plate-like member 252 is closed against the one plate-like member 251. As a result, a claw 256, which is provided on the plate-like member 252, is held in engagement with a notch 257 of the plate-like member 251 so as to prevent these two plate-like members from being accidentally opened.

In this connection, as previously mentioned, the indented portions 258 provided on the strip film carrier 250 serve to position the carrier 250 when the carrier 250 is loaded onto the 35 mm film adaptor 100. Thus, the indented portions 258 provide the same action as the preceding indented portions 203 of the slide film carrier 200.

Next, it will be described how the film image input device 1 behaves when the 35 mm film adaptor 100 is loaded onto the main device body 1a.

When a power switch (not shown) is turned on, the stepping motor 18 for sub-scanning is rotated to move the lens/CCD-retaining member 7 in the direction of arrow C in FIG. 2. The member 7 then stops at an initial position (corresponding to position P1 in FIG. 12, whose description will be given hereinafter). In addition, the lamp 3 goes on, and the circuit board 13 is ready for image reading.

Then, the slide film carrier 200 having the slide film 401 loaded therein is loaded onto the 35 mm film adaptor 100. Next, the adaptor 100 is inserted into the groove portion 2 of the main device body 1a. As a result, the positioning pins 23, 24 of the main device body 1a and the positioning indented portions 101, 102 of the film adaptor 100 are fitted together, thereby positioning the film adaptor 100. (See FIG. 3.) In this state, the metal plate 107 located on the bottom of the adaptor 100 is brought into contact with the film adaptor-detecting contacts 29, 30 of the main device body 1a, whereby these contacts 29, 30 are conducting.

When it is detected by the image input device 1 that the 35 mm film adaptor 100 has been loaded thereon, the device 1 decides or changes respective ranges of main scanning and sub-scanning by means of the image readout range-changing means, which ranges correspond in size to the picture plane on 35 mm film. The image readout range-changing means is built in CPU 13a.

Figure 12:
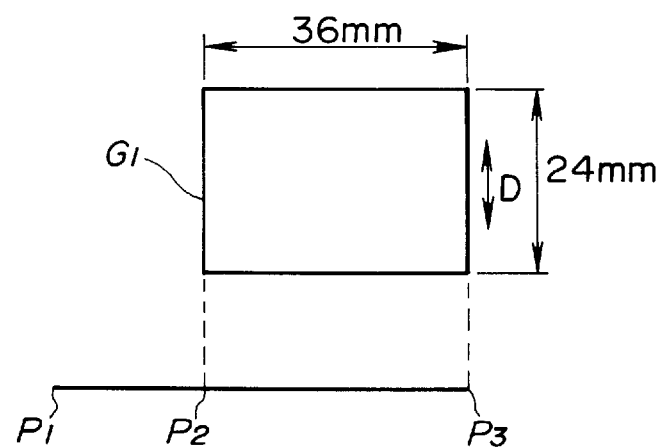
FIG. 12 is an illustration, showing a relationship between a 35 mm film picture plane and a sub-scanning position when the 35 mm film picture plane is read in the device of FIG. 1; and, FIG. 13 is an illustration, showing a relationship between a cartridge film picture plane and a sub-scanning position when each picture plane on the film contained in the new photo system-adapted cartridge is read in the device of FIG. 1.

As FIG. 12 illustrates a relationship between 35 mm film picture plane G1 and a sub-scanning position, assume that, in a moving range of the lens/CCD-retaining member 7, any movement position of the retaining member 7 centered at the linear CCD image sensor 9 is initial position P1; a position at one end of the picture plane on the 35 mm film is P2; and, a position at the other end of the same picture plane is P3. Then, it follows that the sub-scanning lies in the range from position P2 to position P3 with reference to the initial position P1. The positions P2 and P3 are spaced apart from one another by a predetermined distance which corresponds to an image on the film, whereby image data therebetween is picked up.

In this connection, further details of the initial position P1 will now be given. P1 is a center position of the linear CCD image sensor 9 when the output of the lens/CCD-retaining member 7 is changed after the end of the retaining member 7 is driven against the switch 21 in FIG. 3.

In FIG. 12, direction D denotes a direction in which the sensor 9 performs the main scanning. Similar to the range of the sub-scanning, the range of the main-scanning may also be limited to a range corresponding to the film image.

For the 35 mm film, film picture plane G1 is 24 mm long by 36 mm wide in dimension. Accordingly, the range of the sub-scanning covers a distance of 36 mm from the aforesaid one end position P2 to the other end position P3, in which the sub-scanning starts at P2 and ends at P3. In addition, the range of the main scanning covers a distance of 24 mm.

The lens/CCD-retaining member 7 is moved at high speeds from the initial position P1 to the scanning start position P2 upon receipt of a signal indicative of image pickup start from a computer section (not shown). At position P2, the linear CCD image sensor 9 starts reading (main scanning) a signal representing an image in one line.

When the above reading is finished, the stepping motor 18 is turned by a predetermined amount in order to move the lens/CCD-retaining member 7 by one pixel. In this way, the line-by-line reading by the linear CCD image sensor 9, followed by delivering of the lens/CCD-retaining member 7 are repeated until the scanning end position P3 is reached, whereby an image for one frame is read and converted into a digital signal. Such digitized image signals are sequentially directed to the computer.

When the reading of the image signal for one frame is finished, the lens/CCD-retaining member 7 is returned to the initial position in order to be ready for the following image pickup.

The above description has been made when using the slide film carrier 200 having the slide film 401 loaded therein; however, the above-described actions are unchanged when the 35 mm film adaptor 100 having the strip film carrier 250 loaded thereon is used, in which the carrier 250 has the strip-like film 402 loaded therein.

Furthermore, the order of the film, film carrier, and 35 mm film adaptor being sequentially loaded is not limited to the above, but any sequence to load them brings the image input device into proper operation.

Next, the structure of the cartridge film adaptor 300 capable of loading the aforesaid new photo system-adapted film cartridge thereon will be described with reference to FIGS. 9, 10, and 11.

Figure 9:
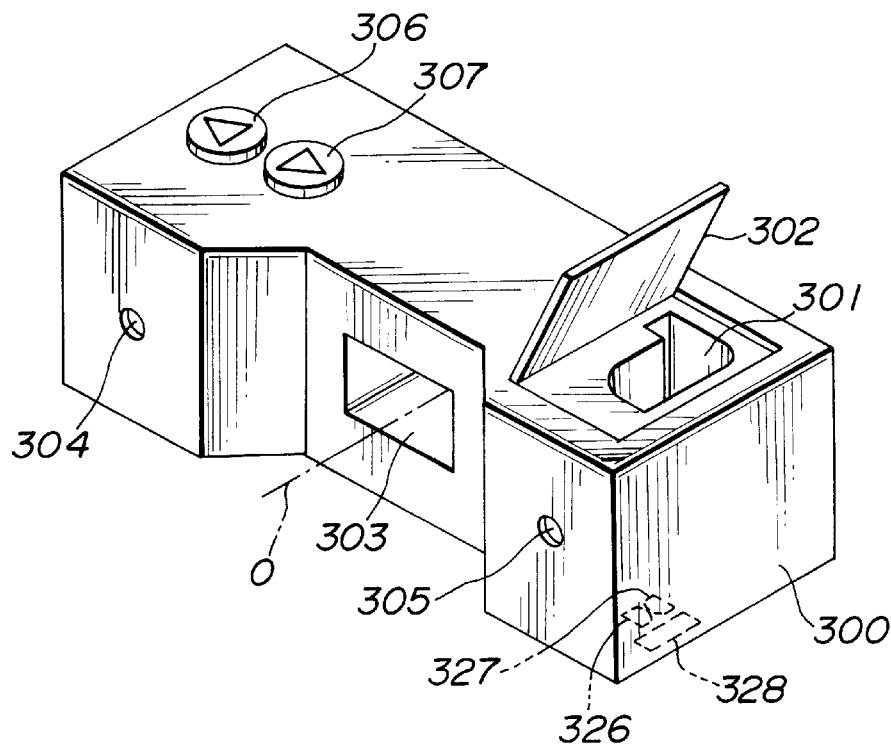
FIG. 9 is a perspective view, illustrating an appearance of a cartridge film adaptor applicable to the device of FIG. 1.

FIG. 9 is a perspective view illustrating an appearance of the cartridge film adaptor 300. FIG. 10 is a perspective view showing a motor-driven, film-feeding/reversing mechanism section inside the cartridge film adaptor 300. FIG. 11 is a perspective view illustrating an appearance of a new photo system-adapted film cartridge 404.

The adaptor 300 showing in FIG. 9 is identical in outer configuration to the groove portion 2 of the main device body 1a, and can be loaded with exact fitting into the groove portion 2. The adaptor 300 is provided with a chamber 301 and a rectangular opening 303. The chamber 301 receives a film cartridge 404 and has door 302 which opens and closes the chamber. The opening 303 is located on a feed path of film 403, and is identical in size to each film picture plane. When each image on the film picture plane is fed to the position of the opening 303, the image is picked up through the lens 8 of the image input device 1, and is then read by the linear/CCD image sensor 9.

The adaptor 300 has indented portions 304 and 305 provided on a side surface thereof for positioning the adaptor 300 when being loaded onto the main device body 1a. These indented portions provide positioning action in a manner similar to the aforesaid dented portions 101, 102 of the 35 mm film adaptor 100.

In addition, the adaptor 300 is provided with a feeding switch button 306 and a rewinding switch button 307 on the top thereof. The feeding switch button 306 is a manipulation switch for pulling and then feeding the film 403 out of the cartridge 404. The rewinding switch button 307 is a manipulation switch for rewinding the film 403 into the cartridge 404.

The adaptor 300 is further provided with contacts 326, 327 and a metal plate 328 on the bottom thereof. The contacts 326, 327 serve to receive the supply of motor-driving power from the contacts 27, 28 of the main device body 1a when the adaptor 300 is fitted to the main body 1a. The metal plate 328 is an electrically conductive member for providing distinguishing information. The metal plate 328 permits the detecting contacts 30, 31 of the main body 1a to be conducting.

Figure 10:
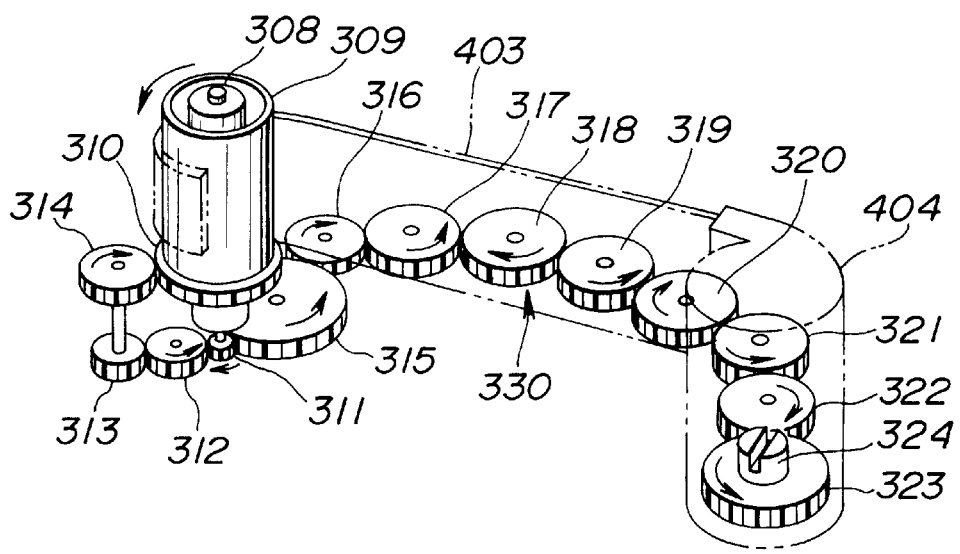
FIG. 10 is a perspective view, depicting a motor-driven, film-feeding/reversing mechanism section inside the cartridge film adaptor of FIG. 9.
Figure 11:
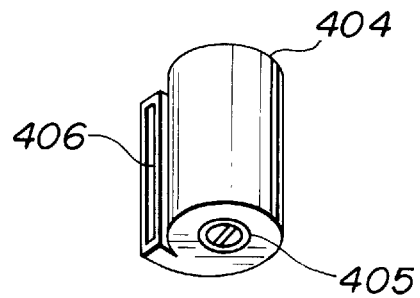
FIG. 11 is a perspective view, illustrating an appearance of a new photo system-adapted film cartridge applicable to the cartridge film adaptor of FIG. 9.

As illustrated in FIG. 10, the motor-driven, film-feeding/reversing mechanism section 330 forms a drive mechanism built in the film adaptor 300, and is provided with the following: a motor 308 for feeding and reversing the film 403; a pinion 311 rigidly mounted on an output shaft of the motor 308; a wind-up spool 309 for winding up the film that is pulled out of the film cartridge 404, the wind-up spool 309 having a gear portion 310 rigidly secured at a lower portion thereof; a drive shaft 324 located at a lower portion of the cartridge chamber 301, the drive shaft 324 being engageable with a spool 405 (see FIG. 11) in the cartridge 404 for rotating the spool 405, and the drive shaft 324 having a gear 323 rigidly secured to a lower portion thereof; and, transmission gears 312–314 and transmission gear trains 315–322 for transmitting a revolving force of the motor 308 to the gear 310 or the gear 323.

The revolving force of the motor 308 is transmitted from the pinion 311 to the gear 310 via the transmission gears 312, 313, 314, thereby driving the wind-up spool 309.

Meanwhile, the revolving force of the motor 308 is transmitted from the pinion 311 to the gear 323 via the transmission gear trains 315, 316, 317, 318, 319, 320, 321, 322, thereby driving the drive shaft 324.

Next, it is described how the film image input device 1 behaves when the cartridge film adaptor 300 is attached to the main device body 1a.

The adaptor 300 is inserted into the groove portion 2 of the main device body 1a. Then, the positioning pins 23, 24 of the main body 1a fit in with the indented portions 304, 305 that function to position the cartridge film adaptor, thereby fixing a position of the cartridge film adaptor. In this state, the contacts 326, 327 on the bottom of the adaptor 300 are driven into contact with the contacts 27, 28 for the supply of electric power from the main body, thereby supplying electric power to the adaptor 300. At the same time, the metal plate 328 is forced into contact with the film adaptor-detecting contacts 30 and 31 of the main device body 1a, whereby the contacts 30 and 31 are conducting.

The detecting contacts 30 and 31 are in a conducting state which causes the device 1 to detect a situation in that the cartridge film adaptor 300 has been loaded on the main device body 1a. Then, the image input device 1 decides or changes respective ranges of main scanning and sub-scanning by means of the image readout range-changing means, which ranges correspond in size to each picture plane on the cartridge film. The image readout range-changing means is housed in CPU 13a.

Figure 13:
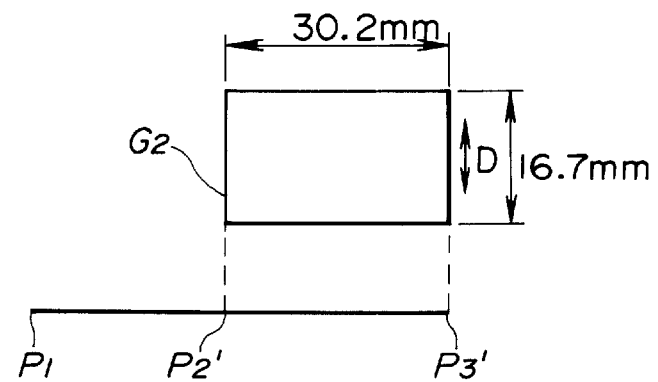

As FIG. 13 illustrates a relationship between film cartridge-contained film picture plane G2 and a sub-scanning position, assume that any movement position centered at the linear CCD image sensor 9 is initial position P1; a position at one end of the picture plane on the film 403 in the new photo system-adapted cartridge 404 is P2'; and, a position at the other end of the same picture plane is P3'. Thus, the sub-scanning lies in the range from position P2' to position P3' with reference to the initial position P1, in which the sub-scanning starts at position P2', and ends at position P3'.

In this connection, direction D denotes a direction in which the sensor 9 executes the main scanning. Similar to the sub-scanning, the main scanning may also be limited to a range corresponding to the film image.

For a dimension of the picture plane of the new photo system-adapted cartridge film, 16.7 mm long by 30.2 mm wide is a standard dimension according to the monthly magazine "Popular Photography" (October, 1994, 8 page). Consequently, a distance between the positions P2' and P3' is 30.2 mm, which covers a range of the sub-scanning to be executed. In addition, the range of the main scanning to be executed is 16.7 mm.

After the film adaptor 300 is loaded, the film cartridge 404 is inserted into the cartridge chamber 301, and then the door 302 is closed. When the film-feeding switch button 306 is pressed, the motor 308 is energized, thereby rotating the gears in directions of arrows in FIG. 10. The wind-up spool 309 and the drive shaft 324 are rotated in respective directions of arrows as well. When the spool 405 is rotated by the drive shaft 324, the film 403 is fed out of the cartridge 404 through a slit 406, as is illustrated in FIG. 11, thereby winding the film 403 onto the wind-up spool 309. When a desired frame on the film 403 arrives at a position opposing the adaptor opening 303, the user's finger is taken off the film-feeding switch button 306 to stop energizing the motor 308, thereby stopping the feeding of the film 403.

Thereafter, the lens/CCD-retaining member 7 is moved with reference to the aforesaid initial position P1, and then output of the linear CCD image sensor 9 between the positions P2' and P3' in the range of the sub-scanning is picked up as image pickup data on film images. However, this processing itself is conducted in a manner similar to the preceding 35 mm film adaptor 100.

Although the lens/CCD-retaining member 7 is moved for scanning in relation to the film, the film may conversely be moved for scanning with reference to the member 7.

As described above, the film image input device 1 according to this aspect of the present embodiment provides an adaptor for retaining film as a removable separate adaptor, in which the film adaptor 100 for the 35 mm film and the film adaptor 300 for the film cartridge are available. As a result, users can use only one main device body to easily accomplish the steps of: distinguishing a type of loaded film between the 35 mm film and the cartridge-contained film; reading images on the film; converting the images into digitized signals; and, feeding the signals into a computer.

In addition, the image input device is capable of detecting a type of a loaded film-retaining adaptor, and then establishing a sub-scanning range suitable for the loaded film. As a result, needless scanning is eliminated, and the image data can be input in a short time.

Furthermore, the film-retaining adaptor is formed by the separate adaptor, as previously mentioned. Accordingly, even when new types of film systems are proposed in the future, it is only necessary to obtain a film-retaining adaptor which provides for such new film systems. As a result, users can accommodate the film image input device to various film systems at less cost.

Industrial Applicability

As described above, in the image input device according to the present invention, film-retaining means for holding film are provided for each type of film. As a result, the above device can be utilized as an image input device that can achieve the following steps by means of only one single unit: reading images on different forms of film; converting the images into digitized signals; and, easily feeding the digitized signals into a computer and the like.

What is claimed is:

1. An image input device including means for reading images on film and converting said images into digital signals, comprising:

a first film-retaining adaptor (100) having a first picture plane size for retaining a first type film (401, 402) and having scanning openings between which a film image is positioned;

a second film-retaining adaptor (300) having a second picture plane size and capable of retaining a second type film (403) which differs in form from said first type film and having scanning openings between which a film image may be positioned;

adaptor receiving means (2), by which said first and second film-retaining adaptors are selectively loaded onto and removed from a main body (1*a*) of said image input device;

information-distinguishing members (107, 328) respectively disposed on said first and second film-retaining adaptors, wherein said respective adaptors are distinguished;

adaptor-determining means (29, 30, 31) for determining a loaded film-retaining adaptor from said information-distinguishing member when one of said first and second film-retaining adaptors is loaded and fixed on said main body; illumination means on one side of said receiving means for illuminating an image positioned between scanning openings of an adaptor loaded into said receiving means: said means for reading and converting images positioned on an opposite side of said receiving means for converting light passing through a film image positioned between said scanning openings into electrical signals; and an image readout range-changing means (13*a*) for changing a readout range on the basis of an output from said adaptor-determining means so as to read images arranged between scanning openings and in a range corresponding to one of said first and second type films.

2. An image input device as defined in claim 1, wherein said first type film is 35 mm type film (401, 402), while said second type film is cartridge-furnished film (403) which is of a type having a roll of developed rolled film contained in a cartridge (404).

3. An image input device as defined in claim 2, wherein said second film-retaining adaptor houses a drive mechanism (330) which can feed and move loaded film.

4. In a film image input device in which an illumination means (3) for illuminating film, a linear CCD image sensor (9) for reading images on said film, and an optical member (8) for permitting said images on said film to be formed on said linear CCD image sensor are linearly arranged, wherein said illumination means, said linear CCD image sensor, and said optical member are jointly moved with respect to said film in order to execute scanning over a film surface, the improvement comprising:

at least two film-retaining adaptors (100, 300) each for retaining a different type of film, each adaptor having a scanning window through which a film image can be scanned;

an adaptor-receiving means (2) arranged between said illumination means and said optical member for selectively and removably retaining said film-retaining adaptors to a main body (1*a*) of said film image input device;

detecting means for detecting an identifying pattern on an adaptor arranged at a fixed position at said receiving means; and a scanning range-changing means (13*a*) for automatically changing both readout and movement ranges of said linear CCD image sensor on the basis of an output from said detecting means in such a manner to accommodate respective picture plane sizes of said at least two types of said film.

5. An image input device including means for reading images on film and converting said images into digital signals, comprising:

at least first and second film-retaining adaptors (100, 300) having substantially the same outer configurations and each accommodating different types of film, whereby said different types of film can be respectively retained;

adaptor receiving means (2), in which a selected one of said at least first and second types of film-retaining adaptors can be loaded and removed from a main body of said image input device, so that the outer configuration of each said film retaining adaptor substantially coincides with an outer configuration of said main body of said image input device forming said receiving means, regardless of which film-retaining means is selected from among said plural types of film retaining means and loaded in a fixed position in said receiving means: and illumination means positioned in said main body adjacent to one side of said receiving means for illuminating an image in an adaptor loaded into the receiving means, said means for reading and converting being positioned in said main body adjacent to another side of said receiving means for converting light passing through said image into electrical signals.

6. An image input device as defined in claim 5, wherein at least one of said film retaining means comprises a cartridge chamber (301) for loading and retaining therein a cartridge (404) having a roller film (403) contained and a film drive mechanism (330) which includes a drive source (308) for feeding and moving a film out of said cartridge.

7. An image input device having means for reading images on film and converting said images into digital signals, comprising:

a first film-retaining adaptor (100) capable of retaining a first type film (401, 402) in which a first signal pattern member (107) having a first distinguishing signal pattern is arranged;

a second film-retaining adaptor (300) in which a rolled film different in picture plane size from said first type film is stored in a cartridge and capable of retaining a second type film (403) which differs in form from said first type film and in which a second signal pattern member (328) having a second distinguishing signal pattern different from said first distinguishing signal pattern is arranged;

adaptor receiving means (2), by which said first and second film-retaining adaptors can selectively be loaded into and removed from a main body (1*a*) of said image input device forming said receiving means;

detecting means (29, 30, 31) for detecting an identifying portion of a loaded film-retaining adaptor in accordance with said pattern when one of said first and second film-retaining adaptors is loaded in a fixed position in said receiving means to identify the loaded adaptor;

illumination means positioned in said main body adjacent to one side of said receiving means for illuminating an image in an adaptor loaded into the receiving means, said means for reading and converting being positioned in said main body adjacent to another side of said receiving means for converting light passing through said image into electrical signals; and means responsive to said detecting means for scanning a film in the adaptor mounted in said image input device according to the detected pattern to control reading of images on the film.

8. An image input device having means for reading images on film and converting said images into digital signals, comprising:

a first film-retaining adaptor (100) capable of retaining a first type film (401 402) in which a first signal pattern member (107) having a first distinguishing signal pattern is arranged;

a second film-retaining adaptor (300) in which a rolled film different in picture plane size from said first type film is stored in a cartridge and capable of retaining a second type film (403) which differs in form from said first type film and in which a second signal pattern member (328) having a second distinguishing signal pattern different from said first distinguishing signal pattern is arranged;

adaptor receiving means (2), by which said first and second film-retaining adaptors can selectively be loaded into and removed from a main body (1a) of said image input device; and detecting means (29, 30. 31) for detecting an identifying portion of a loaded film-retaining adaptor in accordance with said pattern when one of said first and second film-retaining adaptors is loaded in a fixed position in said receiving means to identify the loaded adaptor; said detecting means having electrical signal contacts (29, 30, 31) at positions corresponding to said first signal pattern member and said second signal pattern member to distinguish the film retaining adaptors loaded depending on differences in the conductive state of said electrical signal contacts when said film-retaining adaptors are respectively loaded onto and removed from said main body of said image input device.

9. An image input device having means for reading and converting film images into electrical signals, comprising:

a first film-retaining adaptor (100) for retaining a first picture plane-sized film (401, 402);

a second film-retaining adaptor (300) for retaining a second picture plane-sized film (403);

said first and second film-retaining means having different identifying portions;

adaptor receiving means (2) in which one of said first film retaining adaptor and said second film retaining adaptor are selectively removably loaded in a fixed position onto a main body of said image input device forming said receiving means;

information distinguishing members (107, 328) provided with said first and second film retaining adaptors to enable the distinguishing of respective adaptors; and adaptor determining means (29, 30, 31) for determining such loaded one of said first and second film retaining adaptors by said information distinguishing members when said first or second film retaining adaptor is loaded in said fixed position;

illumination means positioned in said main body adjacent to one side of said receiving means for illuminating an image in an adaptor loaded into the receiving means, said means for reading and converting being positioned in said main body adjacent to another side of said receiving means for converting light passing through said image into electrical signals; and means responsive to an output of the determining means for scanning in order to read images on a film in the adaptor.

10. An image input device as defined in claim 9, wherein said loading means has positioning means (23, 24) which engage at least one of positioning convexities and concavities (101, 102, 304, 305) that are provided in positions on said film-retaining adaptors.

11. An image input device as defined in claim 9, wherein said reading and converting means includes a linear CCD image sensor (9) for converting illuminated images on said film into electrical signals;

an optical means (8) for permitting said images on said film to be focused on said linear CCD image sensor; and, a scanning means (15, 17, 18 19, 20) for driving said illumination means, said linear CCD image sensor, and said optical means in unison; and said drive means is driven on condition that any position except for a picture plane to be read is taken as an initial position.

12. An image input device having means for reading and converting film images into electrical signals, comprising:

a first film-retaining adaptor (100) for retaining a first picture plane-sized film (401, 402);

a second film-retaining adaptor (300) for retaining a second picture plane-sized, rolled film (403) that is contained in a cartridge (404), said second film-retaining means having a drive source (308) for feeding said film and further having operation switches (306, 307) for controlling behavior of said drive source;

a main body having adaptor receiving means (2) by which one of said first and second film-retaining means can be selectively loaded;

illumination means positioned in said main body adjacent to one side of said receiving means for illuminating an image in an adaptor loaded into the receiving means, said means for reading and converting being positioned in said main body adjacent to another side of said receiving means for converting light passing through said image into electrical signals; and scanning means for reading images on a film of one of said first and second film-retaining means selectively loaded in said receiving means.

13. The device of claim 12 further comprising:

means for coupling power in said image input device to operate said drive source only when said second film-retaining means is loaded in said loading means to enable operation of the second film-retaining means by said operation switches.

14. The device of claim 12 further comprising means for identifying the film-retaining means in said loading means to select a image range employed in converting a film image.

15. An image input device including means for reading images on film and converting said images into digital signals, comprising:

a first film-retaining adaptor (100) having a first picture plane size for retaining a first type film (401, 402) and having scanning openings between which a film is positioned;

a second film-retaining adaptor (300) having a second picture plane size and capable of retaining a second type film (403) which differs in form from said first type film and having scanning openings between which a film image may be positioned;

adaptor receiving means (2), by which said first and second film-retaining adaptors are selectively loaded onto and removed from a main body (1a) of said image input device;

information-distinguishing members (107, 328) respectively disposed on said first and second film-retaining adaptors, wherein said respective adaptors are distinguished; and adaptor-determining means (29, 30, 31) for determining a loaded film-retaining adaptor from said information-distinguishing member when one of said first and second film-retaining adaptors is loaded and fixed on said main body;

said information distinguishing members (107, 328) being composed of electrically conductive metal plates and arranged to form different patterns for said first film retaining adaptor and said second film retaining adaptor.

16. An image input device including means for reading images on film and converting said images into digital signals, comprising:

a first film-retaining adaptor (100) capable of retaining a strip of a first type film (401. 402);

a second film-retaining adaptor (300). in which a second type film (403) contained in a cartridge (404) can be loaded and retained, said second type film being different in form from said first type film, said second film-retaining adaptor having a drive mechanism (330) for feeding and moving said second type film; and a main body of said image input device having adaptor receiving means (2), by which said first and second film-retaining adaptors can selectively be loaded onto and removed from said main body wherein outer configurations of said first and second firm-retaining adaptors are substantially the same; and wherein said main body (1*a*) of said image input device supplies electricity to said drive source (308) of said film drive mechanism for feeding the film out of the film cartridge.

* * * * *

UNITED STATES PATENT AND TRADEMARK OFFICE
CERTIFICATE OF CORRECTION

PATENT NO : 5,973,729
DATED : October 26, 1999
INVENTOR(S): Yoichi Washizu

It is certified that error appears in the above-identified patent and that said Letters Patent are hereby corrected as shown below:

On the title page: Item [56]
In Foreign Patent Documents Section, add the following:
-- 5-20455    03/1993    Japan
   6-236340   08/1994    Japan --.

At column 2, line 37, delete "313 3" and insert -- 3-3' --.
At column 4, line 2, delete "3-3" and insert -- 3-3' --.
At column 8, line 50, delete "dented" and insert -- indented --.

IN THE CLAIMS
In claim 1, column 11, line 18, delete "body; illumination" and insert
-- body;
   illumination --.
In claim 1, column 11, line 20, delete ":" and insert -- ; --.

Signed and Sealed this

Fifteenth Day of May, 2001

*Attest:*

NICHOLAS P. GODICI

*Attesting Officer*    *Acting Director of the United States Patent and Trademark Office*